(12) United States Patent
Lopez et al.

(10) Patent No.: US 7,798,526 B2
(45) Date of Patent: Sep. 21, 2010

(54) STEERING COLUMN ASSEMBLY

(75) Inventors: Juan A. Lopez, Juarez (MX); David Komiyama, Juarez (MX); Laura Irigoyen, Juarez (MX); Douglas M. Schneider, El Paso, TX (US)

(73) Assignee: GM Global Technology Operations, Inc., Detroit, MI (US)

( * ) Notice: Subject to any disclaimer, the term of this patent is extended or adjusted under 35 U.S.C. 154(b) by 217 days.

(21) Appl. No.: 12/114,360

(22) Filed: May 2, 2008

(65) Prior Publication Data

US 2008/0272583 A1 Nov. 6, 2008

Related U.S. Application Data

(60) Provisional application No. 60/927,652, filed on May 4, 2007.

(51) Int. Cl.
*B62D 1/18* (2006.01)

(52) U.S. Cl. .................. 280/777; 188/371; 188/377

(58) Field of Classification Search .......... 188/371, 188/375, 376, 377; 74/492; 280/777
See application file for complete search history.

(56) References Cited

U.S. PATENT DOCUMENTS

| | | | |
|---|---|---|---|
| 1,461,210 A | | 7/1923 | Corley |
| 3,424,263 A | * | 1/1969 | Black .......................... 280/777 |
| 3,702,081 A | | 11/1972 | Arnston |
| 4,627,306 A | | 12/1986 | Berenjian |
| 4,703,669 A | | 11/1987 | Hyodo |
| 4,733,575 A | * | 3/1988 | Nakamura ................... 74/493 |
| 5,024,118 A | | 6/1991 | Khalifa et al. |
| 5,056,818 A | * | 10/1991 | Sadakata ..................... 280/777 |
| 5,085,467 A | * | 2/1992 | Converse .................... 280/777 |
| 5,228,359 A | | 7/1993 | Thomas |
| 5,230,533 A | * | 7/1993 | Yamaguchi .................. 280/775 |
| 5,248,214 A | * | 9/1993 | Duffy et al. ..................... 403/2 |
| 5,294,149 A | | 3/1994 | Haldric et al. |
| 5,690,363 A | | 11/1997 | Rybinski |
| 5,829,310 A | * | 11/1998 | DePaolis ...................... 74/492 |
| 5,875,686 A | | 3/1999 | Kinoshita et al. |
| 6,109,652 A | * | 8/2000 | Kim et al. .................... 280/777 |
| 6,145,406 A | * | 11/2000 | Baumann ..................... 74/492 |
| 6,666,772 B1 | * | 12/2003 | Cheney et al. .............. 464/183 |
| 6,749,222 B2 | * | 6/2004 | Manwaring et al. ......... 280/777 |
| 6,942,250 B2 | | 9/2005 | Dubay et al. |
| 7,143,877 B2 | * | 12/2006 | Dusserre-Telmon et al. . 188/376 |
| 7,264,274 B2 | | 9/2007 | Ridgway et al. |
| 7,469,615 B2 | * | 12/2008 | Finkbeiner et al. ............ 74/493 |

(Continued)

*Primary Examiner*—Paul N Dickson
*Assistant Examiner*—Joseph Rocca
(74) *Attorney, Agent, or Firm*—Cantor Colburn LLP (57) ABSTRACT

A steering column assembly for a vehicle includes an outer jacket, an inner shaft that is received in and rotatable relative to the outer jacket, and an energy absorbing bracket. The energy absorbing bracket includes a mounting portion rigid attached to the vehicle and a body portion extending from the mounting portion. The outer jacket is rigidly attached to the body portion and the body portion is deformable to absorb energy in response to movement of the outer jacket. A tab is connected to one of the body portion and the mounting portion and abuts the outer jacket for applying a resistive force against movement of the outer jacket. The tab releases the resistive force in response to a predetermined collapsing force to allow the outer jacket to move while the body portion of the energy absorbing bracket deforms to absorb energy from the outer jacket.

20 Claims, 5 Drawing Sheets

U.S. PATENT DOCUMENTS

2005/0077716 A1* 4/2005 Urista et al. ................. 280/777
2005/0082811 A1* 4/2005 Matsumiya ................. 280/777
2005/0184500 A1* 8/2005 Finkbeiner et al. .......... 280/777
2006/0181070 A1* 8/2006 Imamura et al. ............ 280/777
2007/0113701 A1* 5/2007 Streng et al. .................. 74/492

* cited by examiner

STEERING COLUMN ASSEMBLY

CROSS-REFERENCE TO RELATED APPLICATIONS

The subject patent application claims priority to and all the benefits of U.S. Provisional Patent Application Ser. No. 60/927,652 which was filed on May 4, 2007, the entire specification of which is expressly incorporated herein by reference.

BACKGROUND OF THE INVENTION

1. Field of the Invention

The present invention relates to an energy absorbing bracket for a steering column of a vehicle.

2. Description of the Related Art

Steering column assemblies for vehicles include an outer jacket and an inner shaft that is received in and rotatable relative to the outer jacket. A steering wheel is coupled to the inner shaft. Steering column assemblies can be of the collapsible variety. Collapsible steering column assemblies are available that collapse during a crash event such as a frontal collision of the vehicle. During the crash event, the collapsible steering column assembly is designed collapse if the momentum of a driver's body applies a force through the steering wheel such that the collapse gradually arrests movement of the driver's body to minimize injury to the driver.

The collapsible steering column assembly includes an energy absorbing bracket rigidly attached to the vehicle. The energy absorbing bracket includes a mounting portion for rigid attachment to the vehicle and a body portion extending from the mounting portion. The outer jacket is spaced from the mounting portion and is rigidly attached to the body portion.

When the driver's body applies force through the steering wheel during a crash event, the force is transmitted to the outer jacket. If the force is sufficiently high, the energy absorbing bracket deforms allowing the outer jacket to axially stroke thereby absorbing energy. It would be desirable to provide an improved steering column assembly that includes improvements over current steering column assemblies such as the ability to be tuned to effectively manage the collapse of the energy absorbing bracket.

SUMMARY OF THE INVENTION AND ADVANTAGES

The present invention includes an energy absorbing bracket for a steering column of a vehicle. The energy absorbing bracket comprises a mounting portion for rigid attachment to the vehicle. A body portion extends from the mounting portion for rigid attachment to the steering column. The body portion is deformable relative to the mounting portion for absorbing energy in response to movement of the steering column relative to the mounting portion. A tab has a first end and a second end with the first end connected to one of the body portion and the mounting portion and the second end spaced from the first end for abutting the steering column to apply a resistive force against movement of the steering column relative to the mounting portion. The tab is releasable to release the resistive force in response to a predetermined collapsing force for allowing the steering column to move relative to the mounting portion while the body portion deforms to absorb energy from the steering column.

The tab and the energy absorbing bracket act together to control the collapse of the steering column assembly. The tab releases the resistive force in response to the application of the predetermined collapsing force before the column can move relative to the mounting portion of the energy absorbing bracket. As such, the configuration of the tab can be tuned to provide a desired running load and such that the tab releases at the predetermined collapsing force. In addition, the overall stiffness, size, and thickness of the body portion can be tuned along with the configuration of the tab thereby providing greater opportunity and flexibility in the design of the body portion of the energy absorbing bracket.

In addition, the tab advantageously provides added performance during normal operation with a reduction in mass and without substantial additional cost. In particular, the tab provides the required stiffness independent of the geometry of the body portion. Specifically, the tab provides vertical support, which advantageously increases stiffness in the vertical direction. Also, the tab provides lateral support, which advantageously provides stiffness in the lateral direction.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
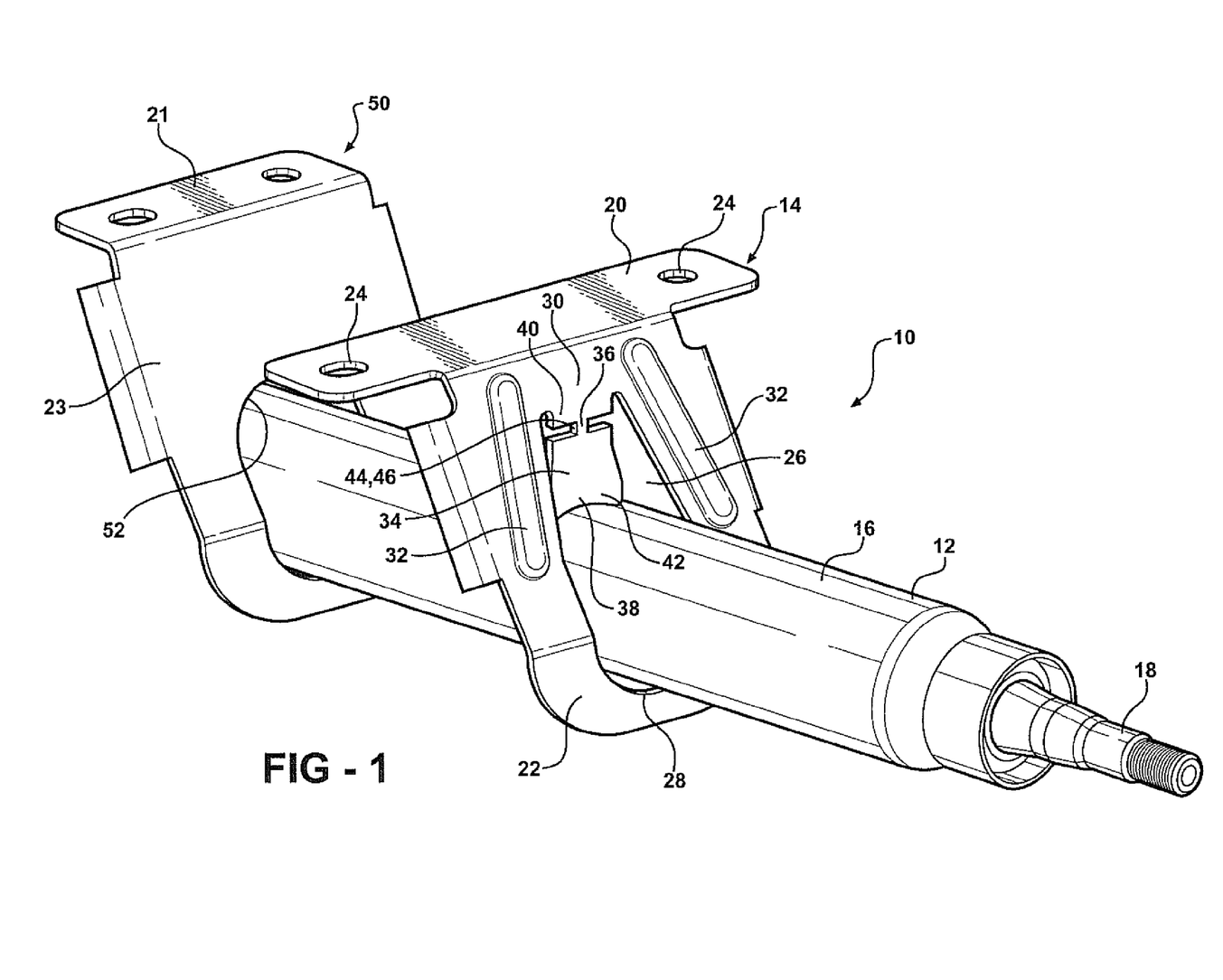
FIG. 1 is a perspective view of a steering column assembly including a column and an energy absorbing bracket.

Referring to the Figures, wherein like numerals indicate like parts throughout the several views, a steering column assembly for a motor vehicle (not shown) is generally shown at 10. As shown in FIG. 1, the steering column assembly 10 includes a column 12 and an energy absorbing bracket 14. The column 12 includes an outer jacket 16 and an inner shaft 18 that is received in and rotatable relative to the outer jacket 16. A steering wheel (not shown) is typically coupled to the inner shaft 18 as is known in the art. The steering column assembly 10 may take any of the known forms and configurations, but is of the collapsible variety. For example, during a crash event involving the vehicle, the steering column assembly 10 is designed collapse if the momentum of a driver's body applies a predetermined collapsing force F through the steering wheel such that the collapse gradually arrests movement of the driver's body to minimize injury to the driver. Specifically, the column 12 axially moves, i.e., strokes, relative to the vehicle and absorbs energy to arrest movement of the driver's body.

As shown in FIGS. 2-5 and 9, the energy absorbing bracket 14 includes a mounting portion 20 and a body portion 22 extending from the mounting portion 20. The body portion 22 extends transversely relative to the mounting portion 20. The mounting portion 20 and the body portion 22 are typically integral with each other, i.e., formed as a single unit. For example, the energy absorbing bracket 14 can be formed as a flat piece and subsequently bent such that the body portion 22 extends transversely to the mounting portion 20. The energy absorbing bracket 14 is typically formed of metal such as steel. When formed of steel, the energy absorbing bracket 14 can be formed by stamping. However, it is appreciated that the energy absorbing bracket 14 can be formed of any suitable material and by any suitable method without departing from the nature of the present invention.

The mounting portion 20 is rigidly attached to the vehicle. In other words, once attached to the vehicle, the mounting portion 20 is fixed relative to the vehicle. For example, the energy absorbing bracket 14 defines holes 24 for receiving threaded fasteners (not shown) that threadedly engage the vehicle to rigidly attach the mounting portion 20 to the vehicle. It is appreciated that the mounting portion 20 can be rigidly attached to the vehicle in any fashion without departing from the nature of the present invention.

As shown in FIG. 1, the outer jacket 16 is supported by the energy absorbing bracket 14. Specifically, the outer jacket 16 is spaced from the mounting portion 20 of the energy absorbing bracket 14 and is rigidly attached to the body portion 22 of the energy absorbing bracket 14. For example, the outer jacket 16 is welded to the body portion 22. However, it is appreciated that the outer jacket 16 can be rigidly attached the energy absorbing bracket 14 in any fashion without departing from the nature of the present invention.

Figure 2:
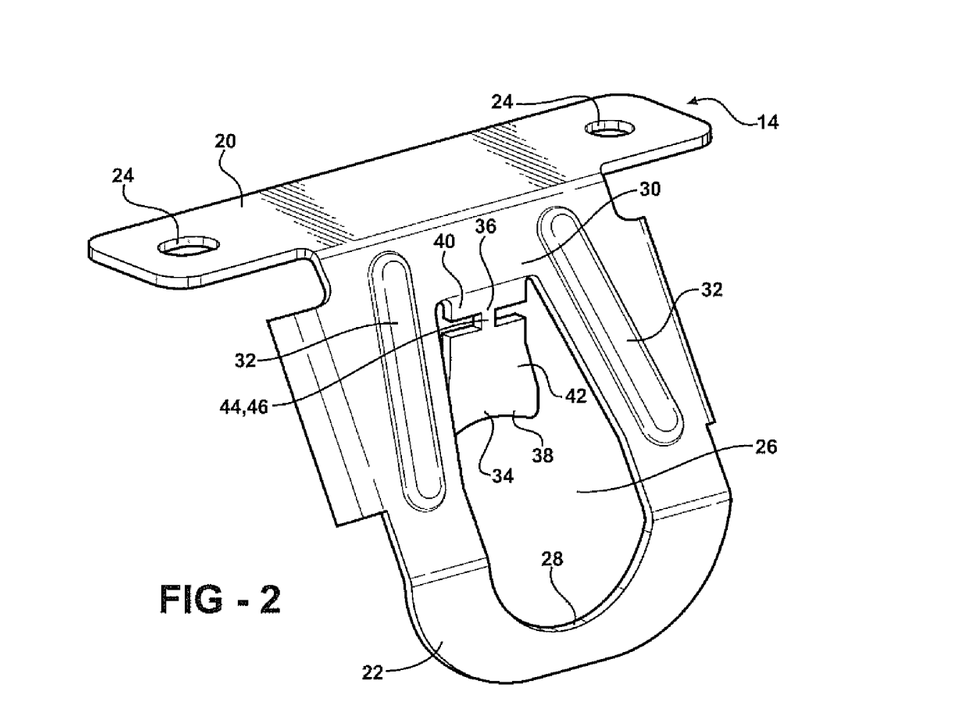
FIG. 2 is a perspective view of the energy absorbing bracket including a mounting portion, a body portion, and a tab.
Figure 3:
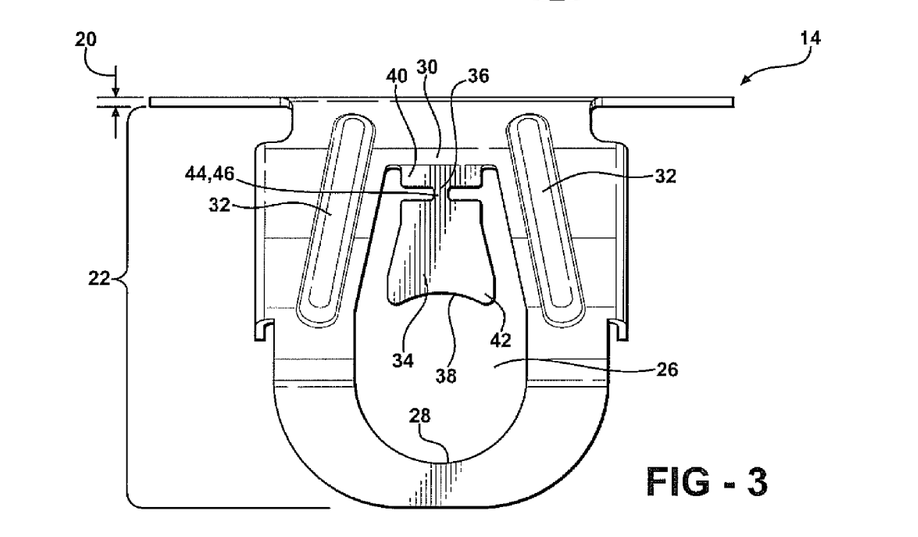
FIG. 3 is a front view of the energy absorbing bracket.
Figure 9:
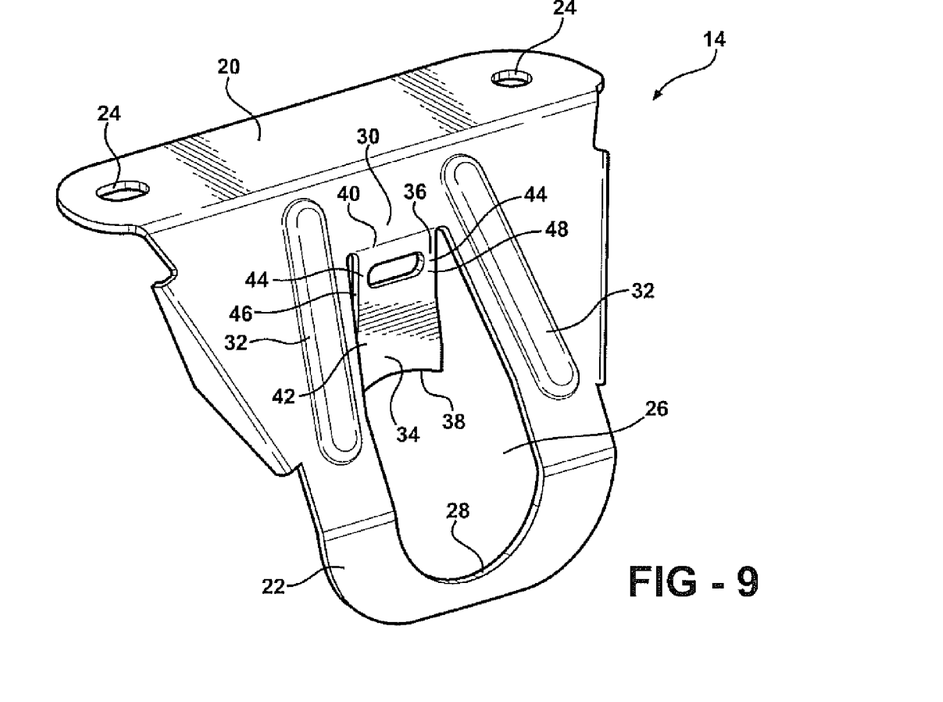
FIG. 9 is a perspective view of another embodiment of the energy absorbing bracket.

As shown in FIGS. 2-3 and 9, the body portion 22 is typically U-shaped defining an interior opening 26. Specifically, the body portion 22 includes a curved inner wall 28 forming a portion of the interior opening 26 for mating with the outer jacket 16. The curved inner wall 28 faces an upper wall structure 30 for forming the remaining portion of the interior opening 26. As shown in FIG. 1, the column 12 extends through the interior opening 26 and is rigidly attached to the curved inner wall 28.

Figure 6:
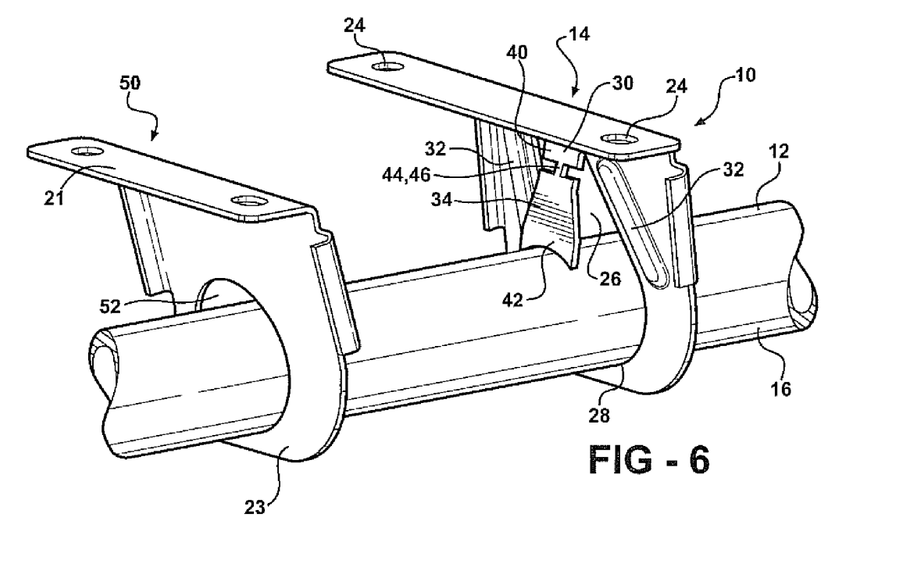
FIG. 6 is a another perspective view of the steering column assembly.
Figure 7:
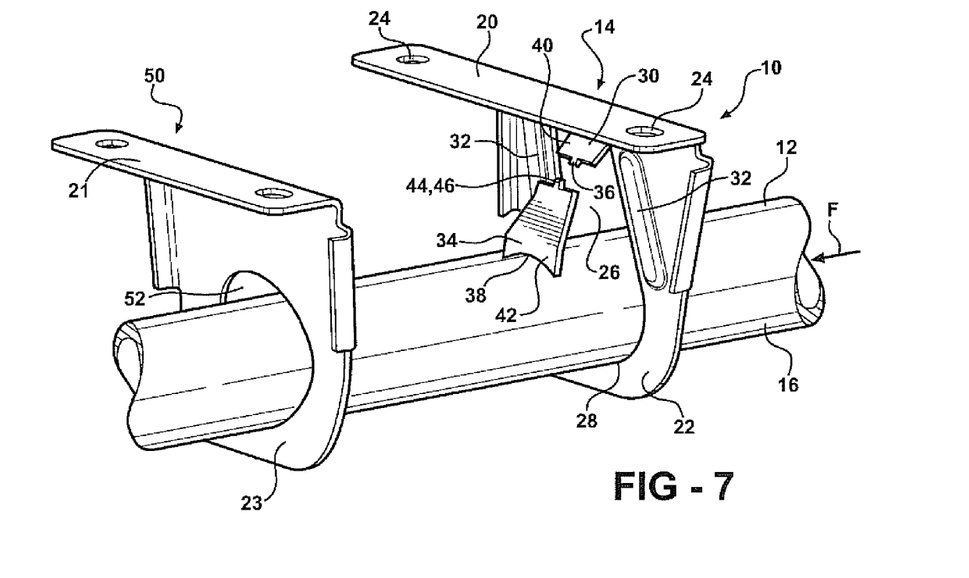
FIG. 7 is a perspective view of the steering column assembly with the column moved relative to the mounting portion of the energy absorbing bracket and with the tab broken.
Figure 8:
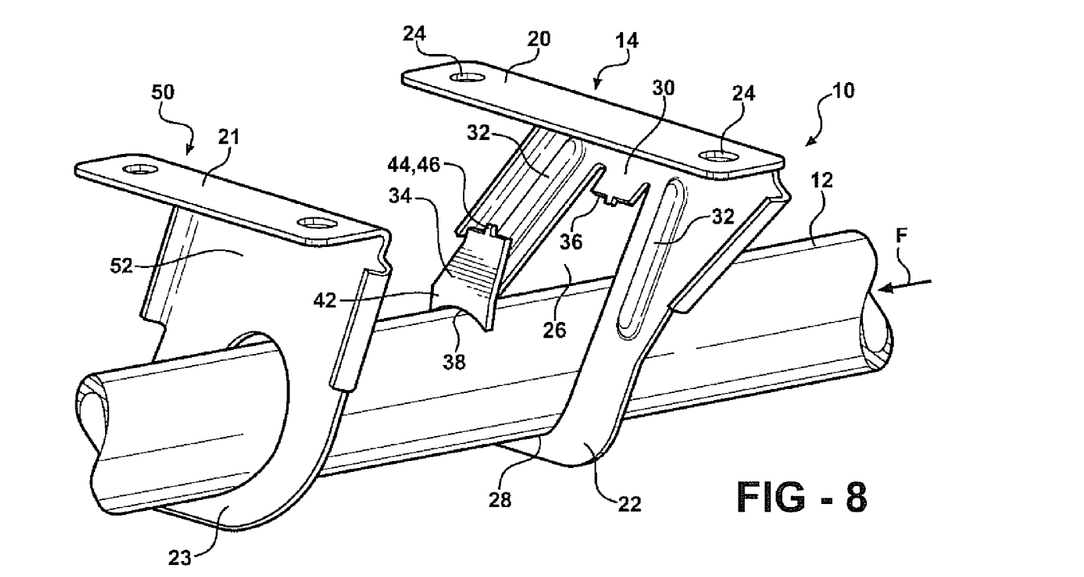
FIG. 8 is a perspective view of the steering column assembly with the column moved relative to the mounting portion further than shown in FIG. 7.

As discussed further below and as shown in FIGS. 6-8, the body portion 22 is deformable relative to the mounting portion 20 for absorbing energy in response to axial movement of the outer jacket 16 relative to the mounting portion 20. In other words, the body portion 22 bends such that the body portion 22 absorbs energy and resists and/or prevents axial movement of the outer jacket 16 relative to the mounting portion 20. For example, the outer jacket 16 moves axially when a force is applied by the driver's body to the steering wheel during a crash event and the body portion 22 of the energy absorbing bracket deforms to gradually absorb energy to arrest the movement of the column 12. Typically, the body portion 22 plastically deforms to absorb energy from the outer jacket 16. The dimensions and the orientation of the energy absorbing bracket 14 can be tuned to provide the proper energy absorption and the proper stroke of the column 12, for example, when the predetermined collapsing force F is applied by the driver's body to the steering wheel during a crash event.

The body portion 22 of the energy absorbing bracket includes at least one rib 32 for providing rigidity to the body portion 22 as the body portion 22 deforms. Specifically, in the embodiments shown in the Figures, a pair of ribs 32 are formed in the body portion 22 flanking the interior opening 26 to provide added structural integrity. It is appreciated that the body portion 22 can have no ribs or any number of ribs without departing from the nature of the present invention. As appreciated by those skilled in the art, the body portion 22 may be configured of any suitable shape or size as is desired to meet a particular application.

The energy absorbing bracket 14 includes a tab 34 extending in proximity to the interior opening 26 to the energy absorbing bracket 14, as shown in FIGS. 1-9. As discussed further below, the tab 34 applies a resistive force against movement of the outer jacket 16 relative to the mounting portion 20. The tab 34 is also releasable to release the resistive force, i.e., to allow the outer jacket 16 to move relative to the mounting portion 20. The tab 34 releases the resistive force in response to the predetermined collapsing force F, e.g., a sufficient force applied by the driver's body to the steering wheel during a crash event. After the tab 34 releases the resistive force, movement of the outer jacket 16 relative to the mounting portion 20 deforms as described above.

The tab 34 and the energy absorbing bracket 14 act together to control the collapse of the steering column assembly. Specifically, the tab 34 provides added performance during normal operation and during a crash with a reduction in mass and without substantial additional cost. In particular, the tab 34 provides the required stiffness independent of the geometry of the body portion 22. Specifically, the tab 34 provides vertical support, which increases stiffness in the vertical direction. Also, the tab 34 provides lateral support, which provides stiffness in the lateral direction. Due to the relative orientation of the tab 34 and the kinematics of the movement of the body portion 22 in a crash, the tab 34 releases the resistive force before the column 12 can stroke in a crash event. Taking into consideration that the tab 34 must release the resistive force first, the cross-sectional thickness and/or configuration of the tab 34 can be tuned to provide a desired running load and a desired breakaway load, i.e., the predetermined collapsing force F, at an initial break point of the crash event. Also, the use of the tab 34 provides greater opportunity and flexibility in the design of the body portion 22 of the energy absorbing bracket 14. For example, the overall stiffness, size, and thickness of the body portion 22 can be tuned.

Figure 4:
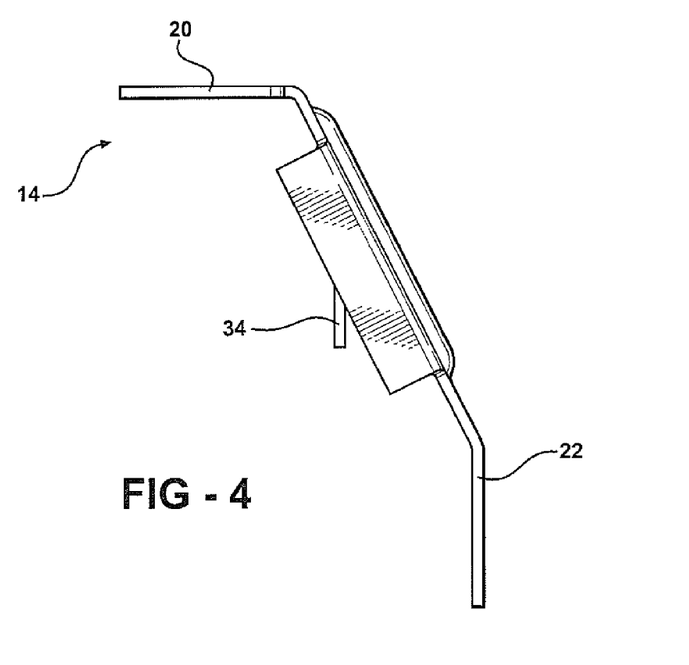
FIG. 4 is a side view of the energy absorbing bracket.
Figure 5:
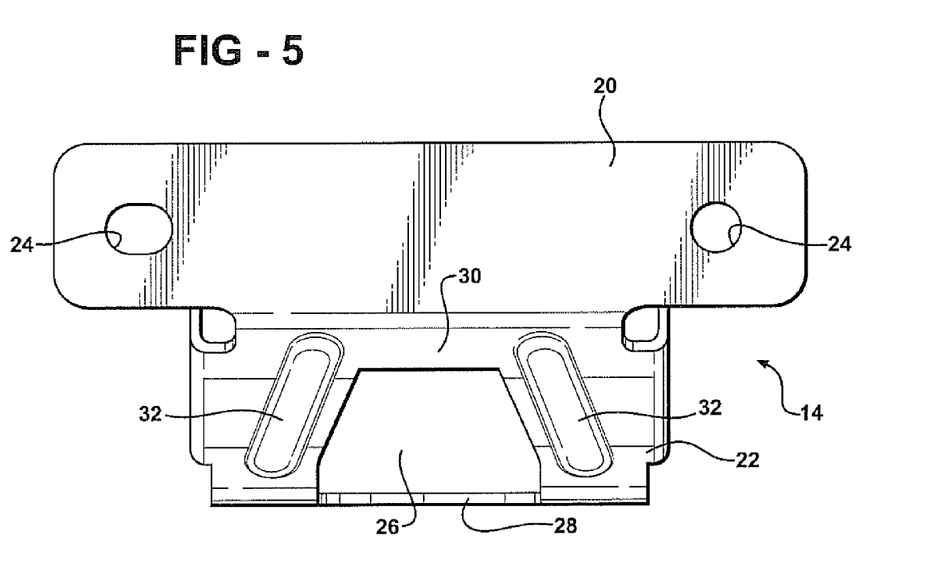
FIG. 5 is a top view of the energy absorbing bracket.

Referring to FIGS. 2-5 and 9, the tab 34 will now be discussed in greater detail. As best shown in FIG. 4, the tab 34 typically extends transversely at an angle to the walls and the interior opening 26 of the body portion 22. The tab 34 is typically integral with the rest of the energy absorbing bracket 14, i.e., the mounting portion 20, the body portion 22, and the tab 34 are formed as a single unit.

The tab 34 has a first end 36 and a second end 38. The first end 36 of the tab 34 is connected to one of the body portion 22 and the mounting portion 20 of the energy absorbing bracket 14. Specifically, in the configuration shown in the Figures, the tab 34 extends from the upper wall structure 30 of the body portion 22 in the general direction of the interior opening 26. Even more specifically, the tab 34 extends from a protrusion 40 on the upper wall structure 30 generally toward the curved inner wall 28.

The second end 38 of the tab 34 is spaced from the first end 36 and abuts the outer jacket 16 such that movement of the outer jacket 16 is transferred to the second end 38, i.e., the second end 38 moves with the outer jacket 16. Because the first end 36 of the tab 34 is connected to the body portion 22 or the mounting portion 20 and the second end 38 abuts and moves with the outer jacket 16, the tab 34 applies the resistive force against movement of the outer jacket 16 relative to the mounting portion 20. The tab 34 may have any suitable configuration and is preferably curved at the second end 38 for abutment with the outer jacket 16.

The second end 38 is typically rigidly attached to the outer jacket 16. For example, the outer jacket 16 is welded to the body portion 22. However, it is appreciated that the outer jacket 16 can be rigidly attached the energy absorbing bracket 14 in any fashion without departing from the nature of the present invention. It is also appreciated that the tab 34 can abut and interact with the outer jacket 16 to move with the outer jacket 16 without being rigidly attached to the outer jacket 16.

As set forth above, the tab 34 is releasable to release the resistive force in response to the predetermined collapsing force F. For example, the predetermined collapsing force F is typically between 0.8 KN and 7.5 KN. However, it is appreciated that the predetermined collapsing force can be of any magnitude without departing from the nature of the present invention. In the embodiments shown in the Figures, the tab 34 includes a main portion 42 and a weakened portion 44 deforming to release the resistive force in response to the predetermined collapsing force F. For example, as shown in FIG. 7, the weakened portion 44 breaks, i.e., fragments into at least two pieces, to release the resistive force in response to the predetermined collapsing force F. The weakened portion 44 of the tab 34 is connected to the body portion 22 of the energy absorbing bracket 14 and the main portion 42 is connected to the weakened portion 44 and to the outer jacket 16 of the column 12, i.e., the main portion 42 extends from the weakened portion 44 to the outer jacket 16. It is appreciated that the deformation of the tab 34 is not limited to breaking but can be, for example, plastic or elastic deformation without departing from the nature of the present invention In the embodiments shown in the Figures, the weakened portion 44 of the tab 34 is a neck 46 with the main portion 42 having a first width W1 and with the neck 46 having a second width W2 less than the first width W1. The first width W1 and the second width W2 can be tuned to provide the proper resistive force and predetermined collapsing force F. As shown in FIG. 7, the tab 34 breaks at the neck 46 upon application of the predetermined force.

In the embodiment shown in FIGS. 1-8, the neck 46 bisects the main portion 42. In other words, the neck 46 extends from a central region of the main portion 42. In the embodiment shown in FIG. 9, the weakened portion 44 includes a second neck 48 spaced from the neck 46 and having the first width W1. In the embodiment shown in FIG. 9, the first W1 and second W2 widths and the spacing of the neck 46 and the second neck can be tuned. It is appreciated that the tab 34 can include any number of necks without departing from the nature of the present invention.

The steering column assembly 10 can also include a second energy absorbing bracket 50 spaced from the energy absorbing bracket 14. The second energy absorbing bracket 50 can be the same as or different than the energy absorbing bracket 14. In the configuration shown in the Figures, similar to the energy absorbing bracket 14, the second energy absorbing bracket 50 includes a similar mounting portion 21 and a similar body portion 23 extending from the mounting portion 21. The body portion 23 defines an aperture 52 and the outer jacket 16 extends through the aperture 52. The outer jacket 16 is rigidly attached to the body portion 23 in the aperture 52. As shown in FIGS. 7 and 8, as the outer jacket 16 moves, the body portion 23 deforms relative to the mounting portion 21. The body portion 23 absorbs energy by deforming such that the body portion 23 absorbs energy and resists and/or prevents movement of outer jacket 16 relative to the mounting portion 20. The dimensions and the orientation of the second energy absorbing bracket 50 can be tuned to provide the proper energy absorption and the proper stroke of the outer jacket 16, for example, when a force is applied by the driver's body to the steering wheel during a crash event.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A steering column assembly for a vehicle, said steering column assembly comprising:
    an energy absorbing bracket including a mounting portion for rigid attachment to the vehicle and a body portion extending from said mounting portion;
    an outer jacket spaced from said mounting portion of said energy absorbing bracket and having a first connection to said energy absorbing bracket comprising a rigid attachment to said body portion of said energy absorbing bracket with said body portion being deformable relative to said mounting portion for absorbing energy in response to movement of said outer jacket relative to said mounting portion;
    an inner shaft that is received in and rotatable relative to said outer jacket; and
    a tab having a first end and a second end with said first end connected to one of said body portion and said mounting portion of said energy absorbing bracket and said second end spaced from said first end, said second end forming a second connection between the energy absorbing bracket and the outer jacket comprising a rigid attachment to the outer jacket or an abutment against the outer jacket for applying a resistive force, through said second connection, against movement of said outer jacket relative to said mounting portion with said tab being releasable to release said resistive force in response to a predetermined collapsing force for allowing said outer jacket to move relative to said mounting portion while said body portion of said energy absorbing bracket deforms to absorb energy from said outer jacket.

2. The steering column assembly as set forth in claim 1 wherein said tab includes a main portion and a weakened portion deforming to release said resistive force in response to said predetermined collapsing force.

3. The steering column assembly as set forth in claim 2 wherein said weakened portion breaks to release said resistive force in response to said predetermined collapsing force.

4. The steering column assembly as set forth in claim 2 wherein said weakened portion of said tab is connected to said body portion of said energy absorbing bracket and said main portion is connected to said weakened portion and to said outer jacket of said steering column.

5. The steering column assembly as set forth in claim 2 wherein said weakened portion of said tab is further defined as a neck with said main portion having a first width and with said neck having a second width less than said first width.

6. The steering column assembly as set forth in claim 5 wherein said neck bisects said main portion.

7. The steering column assembly as set forth in claim 5 wherein said weakened portion includes a second neck spaced from said neck.

8. The steering column assembly as set forth in claim 1 wherein said body portion defines an interior opening and includes a curved inner wall forming a portion of said interior opening with said steering column extending through said interior opening and rigidly attached to said inner wall.

9. The steering column assembly as set forth in claim 8 wherein said tab extends from said body portion to said steering column transversely to said inner wall.

10. The steering column assembly as set forth in claim 1 wherein said body portion of said energy absorbing bracket includes at least one rib for providing rigidity to said body portion.

11. An energy absorbing bracket for a steering column of a vehicle, said energy absorbing bracket comprising:

a mounting portion for rigid attachment to the vehicle;

a body portion extending from said mounting portion for rigid attachment to the steering column with said body portion being deformable relative to said mounting portion for absorbing energy in response to movement of the steering column relative to said mounting portion; and a tab having a first end and a second end with said first end connected to one of said body portion and said mounting portion and said second end spaced from said first end for abutting the steering column to apply a resistive force against movement of the steering column relative to said mounting portion with said tab being releasable, without breaking the rigid attachment of the steering column to said body portion, to release said resistive force in response to a predetermined collapsing force for allowing the steering column to move relative to said mounting portion while said body portion deforms to absorb energy from said steering column.

12. The energy absorbing bracket as set forth in claim 11 wherein said tab includes a main portion and a weakened portion deforming to release said resistive force in response to said predetermined collapsing force.

13. The energy absorbing bracket as set forth in claim 12 wherein said weakened portion breaks to release said resistive force in response to said predetermined collapsing force.

14. The energy absorbing bracket as set forth in claim 12 wherein said weakened portion of said tab extends from said body portion to said main portion of said tab and is connected to said main portion for supporting said main portion between said weakened portion and the steering column.

15. The energy absorbing bracket as set forth in claim 12 wherein said weakened portion of said tab is further defined as a neck with said main portion having a first width and with said neck having a second width less than said first width.

16. The energy absorbing bracket as set forth in claim 15 wherein said neck bisects said main portion.

17. The energy absorbing bracket as set forth in claim 15 wherein said weakened portion includes a second neck spaced from said neck.

18. The energy absorbing bracket as set forth in claim 11 wherein said body portion defines an interior opening for receiving the steering column and includes a curved inner wall forming a portion of said interior opening for rigidly attachment to the steering column.

19. The energy absorbing bracket as set forth in claim 18 wherein said tab extends from said body portion transversely to said inner wall.

20. The energy absorbing bracket as set forth in claim 11 wherein said body portion includes at least one rib for providing rigidity to said body portion.

* * * * *